United States Patent
Neumann

(10) Patent No.: US 10,861,076 B1
(45) Date of Patent: Dec. 8, 2020

(54) METHODS, SYSTEMS, AND DEVICES FOR GENERATING A REFRESHMENT INSTRUCTION SET BASED ON INDIVIDUAL PREFERENCES

(71) Applicant: KPN Innovations, LLC, Lakewood, CO (US)

(72) Inventor: Kenneth Neumann, Lakewood, CO (US)

( * ) Notice: Subject to any disclaimer, the term of this patent is extended or adjusted under 35 U.S.C. 154(b) by 0 days.

(21) Appl. No.: 16/887,388

(22) Filed: May 29, 2020

(51) Int. Cl.
  *G06Q 30/00* (2012.01)
  *G06Q 30/06* (2012.01)
  *G06N 20/00* (2019.01)
  *G06Q 50/12* (2012.01)

(52) U.S. Cl.
  CPC ......... *G06Q 30/0621* (2013.01); *G06N 20/00* (2019.01); *G06Q 30/0627* (2013.01); *G06Q 30/0641* (2013.01); *G06Q 50/12* (2013.01)

(58) Field of Classification Search
  None
  See application file for complete search history.

(56) References Cited

U.S. PATENT DOCUMENTS

| | | | | |
|---|---|---|---|---|
| 8,762,167 B2* | 6/2014 | Blander | ............... | G16H 20/30 |
| | | | | 705/2 |
| 8,920,175 B2 | 12/2014 | Black | | |
| 9,183,757 B2* | 11/2015 | Yamada | ............... | G06Q 50/22 |
| 9,275,393 B2 | 3/2016 | Argue et al. | | |
| 10,102,345 B2* | 10/2018 | Yanev | ............... | G16H 20/40 |
| 10,553,316 B1* | 2/2020 | Neumann | ............... | G16H 20/60 |
| 2007/0143126 A1* | 6/2007 | Ghose | ............... | G06F 19/3475 |
| | | | | 434/127 |
| 2008/0235232 A1* | 9/2008 | Moses | ............... | G06Q 10/10 |
| 2013/0079612 A1* | 3/2013 | Hunt | ............... | A61B 5/14532 |
| | | | | 600/365 |
| 2013/0211948 A1* | 8/2013 | Lipscher | ............... | G06Q 10/109 |
| | | | | 705/26.5 |
| 2015/0079551 A1* | 3/2015 | Egan | ............... | G09B 5/02 |
| | | | | 434/127 |
| 2016/0098942 A1 | 4/2016 | Messier | | |
| 2016/0225284 A1 | 8/2016 | Schoen | | |
| 2016/0357941 A1* | 12/2016 | Wilkinson | ............... | G06F 19/3475 |
| 2016/0357942 A1 | 12/2016 | Wilkinson | | |
| 2017/0193853 A1 | 7/2017 | Byron et al. | | |

(Continued)

OTHER PUBLICATIONS

Agapito G. et al. "DIETOS: a recommender system for adaptive diet monitoring and personalized food suggestion" Fourth International IEEE Workshop on e-Health Pervasive Wireless Applications and Services 2016 (Year: 2016).*

(Continued)

*Primary Examiner* — Naeem U Haq
(74) *Attorney, Agent, or Firm* — Caldwell Intellectual Property Law

(57) ABSTRACT

A system for generating a refreshment instruction set based on individual preferences, the system including a computing device the computing device configured to receive, from a remote device, a user selection relating to nourishment; identify, an alimentary style relating to the user selection; locate, a plurality of recipes relating to the alimentary style; and generate, a refreshment instruction set, wherein the refreshment instruction set further comprises a plurality of recommended refreshments using the plurality of recipes.

16 Claims, 6 Drawing Sheets

(56) References Cited

U.S. PATENT DOCUMENTS

| | | | | |
|---|---|---|---|---|
| 2018/0144820 A1* | 5/2018 | Grimmer | ............ | G06F 16/9535 |
| 2019/0228856 A1* | 7/2019 | Leifer | .................. | G06F 16/335 |
| 2019/0371452 A1* | 12/2019 | Mainardi | ............... | G16H 20/60 |
| 2020/0005928 A1* | 1/2020 | Daniel | .................. | G16H 20/30 |
| 2020/0066181 A1* | 2/2020 | Hadjigeorgiou | ....... | G16H 20/60 |
| 2020/0075153 A1 | 3/2020 | Murdoch et al. | | |

OTHER PUBLICATIONS

Thi Ngoc Trang Tran et al. "An overview of recommender systems in the healthy food domain" J Intell Inf Syst (2018) 50:501-526 (Year: 2018).*

Raciel Yera Toledo et al. "A Food Recommender System Considering Nutritional Information and User Preferences" IEEE Access vol. 7, 2019 (Year: 2019).*

* cited by examiner

METHODS, SYSTEMS, AND DEVICES FOR GENERATING A REFRESHMENT INSTRUCTION SET BASED ON INDIVIDUAL PREFERENCES

FIELD OF THE INVENTION

The present invention generally relates to the field of nourishment. In particular, the present invention is directed to methods, systems, and devices for generating a refreshment instruction set based on individual preferences.

BACKGROUND

Systems that generate individual refreshment instructions are often overloaded with data. Frequently, individual preferences are analyzed and assessed on a massive scale. Worse, variants among selections and individual likes and dislikes regarding nourishment are not considered.

SUMMARY OF THE DISCLOSURE

In an aspect, a system for generating a refreshment instruction set based on individual preferences, the system comprising a computing device the computing device designed and configured to: receive, from a remote device, a user selection relating to nourishment; determine an alimentary style relating to the user selection using an alimentary style classifier, wherein the alimentary style classifier utilizes the user selection relating to nourishment as an input, and outputs the alimentary style; retrieve a plurality of recipes relating to the alimentary style; receive a schedule associated with a user; and generate a refreshment instruction set including a plurality of recommended refreshments using the plurality of recipes wherein generating the refreshment instruction set further comprises identifying an appointment relating to the user as a function of the schedule; locating a constructed refreshment contained within the refreshment instruction set; and assigning the constructed refreshment on a day of the appointment.

In an aspect, A method of generating a refreshment instruction set based on individual preferences, the method comprising receiving by a computing device, from a remote device, a user selection relating to nourishment; determining by the computing device, an alimentary style relating to the user selection using an alimentary style classifier, wherein the alimentary style classifier utilizes the user selection relating to nourishment as an input, and outputs the alimentary style; retrieving by the computing device, a plurality of recipes relating to the alimentary style; receiving a schedule associated with a user; generating by the computing device, a refreshment instruction set including, a plurality of recommended refreshments using the plurality of recipes, wherein generating the refreshment instruction set further comprises identifying an appointment relating to the user as a function of the schedule; locating a constructed refreshment contained within the refreshment instruction set; and assigning the constructed refreshment on a day of the appointment.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to methods, systems, and devices for generating a refreshment instruction set based on individual preferences. In an embodiment, a computing device receives a user selection relating to nourishment. A computing device selects a plurality of recipes relating to a user's identified alimentary style. A computing device generates a recipe machine-learning model to generate a refreshment instruction containing individual recommended refreshments.

Figure 1:
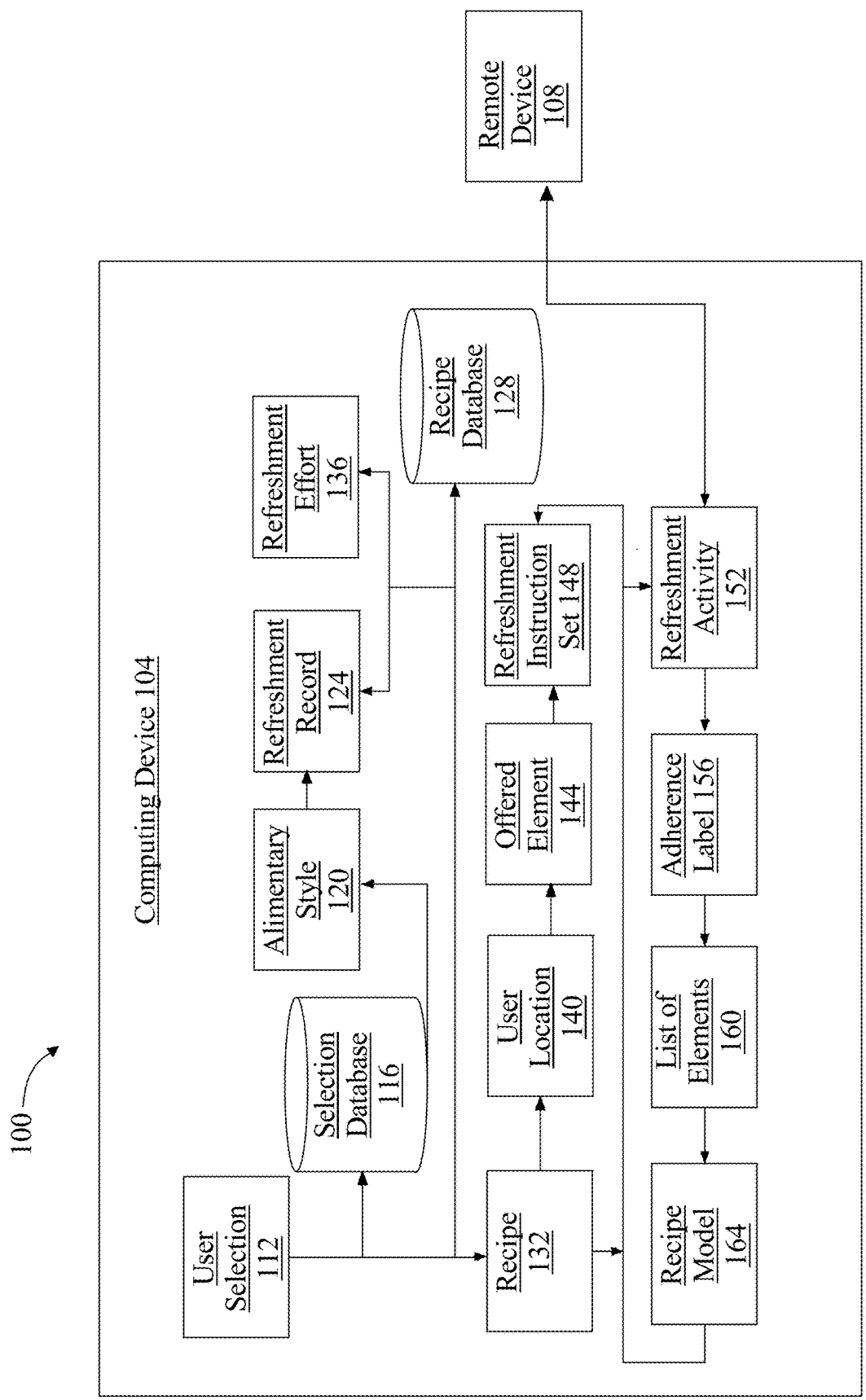
FIG. 1 is a block diagram illustrating an exemplary embodiment of a system for generating a refreshment instruction set based on individual preferences.

Referring now to FIG. 1, an exemplary embodiment of a system 100 for generating a refreshment instruction is illustrated. System 100 includes a computing device 104. Computing device 104 may include any computing device 104 as described in this disclosure, including without limitation a microcontroller, microprocessor, digital signal processor (DSP) and/or system on a chip (SoC) as described in this disclosure. Computing device 104 may include, be included in, and/or connect with a mobile device such as a mobile telephone or smartphone. Computing device 104 may include a single computing device 104 operating independently or may include two or more computing device 104 operating in concert, in parallel, sequentially or the like; two or more computing devices 104 may be included together in a single computing device 104 or in two or more computing devices 104. Computing device 104 may interface or connect with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an association, a building, a campus or other relatively small geographic space), a telephone network, a data network associated with a telephone/voice provider (e.g., a mobile communications provider data and/or voice network), a direct connection between two computing devices 104, and any combinations thereof. A network may employ a wired and/or a wireless mode of communication. In general, any network topology may be used. Information (e.g., data, software etc.) may be transmitted to and/or from a computer and/or a computing device 104. Computing device 104 may include but is not limited to, for example, a computing device 104 or cluster of computing devices 104 in a first position and a second computing device 104 or cluster of computing devices 104 in a second position. Computing device 104 may include one or more computing devices 104 dedicated to data storage, security, dispersal of traffic for load balancing, and the like. Computing device 104 may distribute one or more computing tasks as described below across a plurality of computing devices 104 of computing device 104, which may operate in parallel, in series, redundantly, or in any other manner used for dispersal of tasks or memory between computing devices 104. Computing device 104 may be implemented using a "shared nothing" architecture in which data is cached at the operative, in an embodiment, this may enable scalability of system 100 and/or computing device 104.

Continuing to refer to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence recurrently until a desired or commanded outcome is achieved; repetition of a step or a sequence of steps may be performed iteratively and/or recursively using outputs of previous repetitions as inputs to subsequent repetitions, assembling inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 is configured to receive from a remote device 108 a user selection 112 relating to nourishment. A remote device 108 includes any additional computing device, such as a mobile device, laptop, desktop, computer, and the like. A remote device 108 may include without limitation, a display in communication with computing device 104, where a display may include any display as described herein. Computing device 104 receives a user selection 112 from remote device 108 utilizing any network methodology as described herein.

With continued reference to FIG. 1, a "user selection" as described in this disclosure, is data describing a user's preference in regards to any source of nourishment, including any food and/or beverage consumed by a human being. A user selection 112 may indicate a user's like or dislike of an ingredient, a meal, a drink or beverage, and the like. For instance and without limitation, a user selection 112 may indicate that a user likes ingredients such as avocado, salmon, and jasmine rice, but the user dislikes black olives. In yet another non-limiting example, a user selection 112 may indicate that a user likes meals that include chicken alfredo, chicken parmesan, and spaghetti and meatballs, but the user dislikes meals that contain fish including fish tacos and pan sautéed cod. A user selection 112 may indicate a user's eating patterns including the number of meals a user eats each day, the times of the day the user prefers to eat meals, meals a user skips or does not eat, number of snacks a user consumes each day and the like. A user selection 112 may indicate a user's cooking and meal preparation patterns, including if a user cooks meals at home, orders meal preparation kits, orders prepared foods, shops for groceries online or in person at a grocery store, eats at restaurants, and the like. A user selection 112 may indicate a user's meal and ingredient source, such as if a user prefers ingredients that do not contain genetically modified organisms (GMOs), if a user prefers seafood that is wild caught and sustainable, if a user prefers free-range poultry, and/or if a user prefers organically sourced produce for example. Information pertaining to a user selection 112 may be stored in a selection database 116. Selection database 116 may be implemented, without limitation, as a relational database, a key-value retrieval datastore such as a NOSQL database, or any other format or structure for use as a datastore that a person skilled in the art would recognize as suitable upon review of the entirety of this disclosure.

With continued reference to FIG. 1, computing device 104 is configured to determine an alimentary style 120 relating to a user selection 112. An "alimentary style," as used in this disclosure, is data describing a user's eating style and/or eating habits. An alimentary style 120 may describe a particular diet that a user may follow, such as a user who consumes meat, fish, eggs, vegetables, fruits, nuts, seeds, herbs, spices, health fats and oils and avoids processed foods, sugar, soft drinks, grains, dairy products, legumes, artificial sweeteners, vegetable oils, and trans-fat may be identified as having an alimentary style 120 of a paleo style. In yet another non-limiting example, a user who limits the consumption of foods containing short-chain carbohydrates including fermentable oligosaccharides, disaccharides, monosaccharides, and polyols (FODMAP) may be identified as having an alimentary style 120 of a low-FODMAP style. Computing device 104 determines an alimentary style 120 utilizing a user refreshment record 124. Computing device 104 is configured to receive from a remote device an element of a user refreshment record 124. An "element of a user refreshment record," as used in this disclosure, is any historical records of meals and/or ingredients that a user previously consumed. An element of a user refreshment data may include any meal journals, tracked meals, recorded meals, descriptions of previously consumed meals, photographs and/or pictures of meals and the like that contain any information describing any meal and/or ingredient that a user previously consumed. In an embodiment, information pertaining to an element of a user refreshment record 124 may be stored within selection database 116. For instance and without limitation, an element of a user refreshment record 124 may describe a user's lunch from the previous day which included a turkey sandwich served on multi-grain bread with lettuce, tomato, pickles, and mustard along with a side salad. An element of a user refreshment record 124 may contain a timestamp, indicating the day and/or time that a user consumed a particular meal. For instance and without limitation, an element of a user refreshment record 124 may contain a meal diary containing entrees of every meal that a user ate over a two week period, containing the day, time, and meal that was consumed. Computing device 104 determines an alimentary style 120 utilizing an element of a user refreshment record 124. For instance and without limitation, an element of a user refreshment record 124 that contains meals that do not contain any meat or fish containing meals but that does contain entrees containing eggs and cheese products may be identified as an alimentary style of a vegetarian. In yet another non-limiting example, an element of a user refreshment record 124 that contains meals that vegetables, fruits, nuts, seeds, legumes, potatoes, whole grains, breads, herbs, spices, fish, seafood, and olive oil may be identified as an alimentary style 120 that follows the Mediterranean style of eating. Information pertaining to an alimentary style 120 may be contained within recipe database 128. Computing device 104 may utilize information contained within recipe database 128 to determine an alimentary style 120. Recipe database 128 may be implemented as any data structure suitable for use as selection database 116 as described above in more detail. In an embodiment, an alimentary style 120 may indicate one or more foods that a user chose not to consume because of an allergy or an intolerance. For instance and without limitation, an alimentary style 120 may indicate that a user eats all foods except the user does not consume any foods and/or meals that contain dill weed, as the user dislikes the taste of dill.

With continued reference to FIG. 1, computing device 104 identifies an alimentary style using an alimentary style classifier. A "classification algorithm," as used in this disclosure, is a process whereby a computing device 104 sorts inputs not categories or bins of data. Classification algorithms may include linear classifiers such as logistic regression, Naïve Bayes classification, Fisher's linear discriminant, k-nearest neighbors, support vector machines, quadratic classifiers, Kernel estimation, decision trees, boosted trees, random forest, neural networks, and the like. An "alimentary style classifier," as used in this disclosure, is a classification algorithm that utilizes a user selection relating to nourishment as an input, and outputs an alimentary style relating to the user selection. Computing device 104 trains a classification algorithm utilizing training data, including any of the training data as described herein. Training data may be obtained from previous iterations of generating a classification algorithm, user inputs and/or user surveys, expert input, and the like. Computing device 104 trains alimentary style classifier utilizing training data, wherein training data includes a plurality of data entries containing user selections correlated to corresponding alimentary styles. Training data contains correlations that alimentary style classifier may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), enabling processes or devices to detect categories of data.

With continued reference to FIG. 1, computing device 104 is configured to retrieve a plurality of recipes 132 relating to an alimentary style 120. A "recipe," as used in this disclosure, is a set of instructions for the preparation of a particular dish, including a list of ingredients required to prepare the dish. A recipe relates to an alimentary style 120, when the ingredients require to prepare the dish comply with the alimentary style 120. For instance and without limitation, a recipe for orecchiette pasta with broccoli sauce relates to a vegetarian alimentary style 120, while a recipe for a filet mignon served with potatoes does not relate to a vegetarian alimentary style 120. In an embodiment, a recipe may relate to one or more alimentary style 120. For example, a recipe for coffee crusted steak served with green beans and mashed sweet potatoes may relate to a paleo alimentary style 120, a gluten free alimentary style 120, a low-FODMAP alimentary style 120, a dairy free alimentary style 120, a grain free alimentary style 120 and the like. Information pertaining to recipes and alimentary style 120 may be stored within selection database 116. Computing device 104 locates recipes relating to an alimentary style 120 utilizing user refreshment effort data. Computing device 104 identifies an element of data relating to a user refreshment effort 136. A "user refreshment effort," as used in this disclosure, is any indication as to recipe complexity, cooking time, and/or culinary skill that a user prefers. Information pertaining to a user refreshment effort 136 may be contained within selection database 116. For instance and without limitation, a user refreshment effort 136 may indicate that a user dislikes cooking and/or preparing any meals that take longer than thirty minutes to prepare. In yet another non-limiting example, a user refreshment effort 136 may indicate that a user enjoys preparing complex recipes on the weekends when the user has more time and isn't at work all day, versus during the week the user only likes to prepare meals that take fifteen minutes or less. In yet another non-limiting example, a user refreshment effort 136 may indicate that a user only likes to cook no more than three meals each week. Computing device 104 locates recipes intended for a user refreshment effort 136. In an embodiment, recipes may be stored within recipe database 128 by how much effort they require to prepare, seasonality of ingredients contained within recipes, cooking times, effort and/or skill level needed to prepare, and/or information pertaining to alimentary style 120. In such an instance, computing device 104 matches information relating to a user refreshment effort 136 to information stored about a recipe. For instance and without limitation, computing device 104 locates a user refreshment effort 136 that indicates a user enjoys cooking complex meals because the user attended culinary school, and as such computing device 104 locates recipes that are complex and require greater skill and effort to prepare. In yet another non-limiting example, computing device 104 may generate a query to locate recipes contained within selection database 116 to locate recipes that comply with a user refreshment effort 136. A "query," as used in this disclosure, is any information utilized to identify and/or select a plurality of recipes 132 from selection database 116. For instance and without limitation, a user refreshment effort 136 that describes a user who enjoys cooking meals that take one hour or less to prepare and that are gluten free may be utilized to generate a query to identify recipes that can be cooked in one hour or less and that contain ingredients that are gluten free.

With continued reference to FIG. 1, computing device 104 is configured to receive a schedule associated with a user. A "schedule," as used in this disclosure, is a chart containing information pertaining to any appointments scheduled throughout a day. An appointment may include any personal and/or work related event that may take up any part of a user's day. For instance and without limitation, an appointment may include time spent commuting to and from work each day. In yet another non-limiting example, an appointment may include a work related gala that a user has to partake in one night after work from 6 pm-10 pm. In yet another non-limiting example, an appointment may include a doctor's appointment that a user has. Computing device 104 receives a schedule from a remote device utilizing any network methodology as described herein.

With continued reference to FIG. 1, computing device 104 is configured to receive from a remote device a user location 140. A "user location," as used in this disclosure, is a description of any geographical location where a user is presently located and/or intendeds to be located at a future date and/or time. A user location 140 may include a global positioning system (GPS) of a user, including for example, the GPS location that may be obtained from remote device. A user location 140 may include a description of the latitude and longitude of a position where a user is currently located and/or a position where a user may be located in the future. Computing device 104 identifies offered elements 144 contained within a user location 140. An "offered element," as used in this disclosure, is any recipe ingredient available for sale and/or purchase within the user location 140. Information pertaining to an offered element 144 may be contained within recipe database 128. Recipe database 128 may be implemented as any data structure suitable for use as selection database 116 as described above in more detail. Computing device 104. An offered element 144 may be available for sale and/or purchase at any online and/or retail store location such as for example a grocery store, supermarket, bodega, corner store, food mart, food store, market, and the like. Information pertaining to availability of offered element 144 available at online and/or retail store locations may be updated and stored within recipe database 128. Such information may be received by computing device 104 utilizing any network methodology as described herein. For example, an offered element 144 such as fresh rhubarb may only be available during certain times of the year based on a user's location, such as in Colorado where rhubarb is only available from late June through early July, while in California rhubarb may be available from November through June. In yet another non-limiting example, an offered element 144 may only be available to be acquired and/or purchased in certain areas of the country, such as Wellfleet Oysters that may only be available from Wellfleet, Mass. and may only be sold in neighboring states throughout New England. Computing device 104 adjusts a recipe utilizing offered element 144 contained within a user location 140 and a user alimentary style 120. Computing device 104 adjusts a recipe such as by suggesting a second ingredient that can be substituted in place of a first ingredient that may not be available. For example, computing device 104 may identify an offered element 144 such as hazelnuts that may be available in the Pacific Northwest and may be available in abundance during peak harvesting season within the Pacific Northwest. In such an instance, computing device 104 may adjust a recipe that contains an ingredient such as walnuts, and instead suggests hazelnuts instead, when they are available during peak season. Information pertaining to ingredients and offered element 144 that can be substituted may be contained within recipe database 128.

With continued reference to FIG. 1, computing device 104 is configured to generate a refreshment instruction set 148. A "refreshment instruction set," as used in this disclosure, is a meal plan containing recommended refreshments and a suggested temporal attribute. A "recommended refreshment," as used in this disclosure, is any recommended meals contained within a refreshment instruction set 148. A meal plan may include one or more recommended meals assigned to a particular day, time, and/or meal. For instance and without limitation, a meal plan may contain a week's worth of suggested breakfasts, lunches, dinners, and/or snacks for a user to consume throughout the week. A "refreshment," as used in this disclosure, is any meal, snack, beverage, drink, sub-part of a meal, spice, nutritional supplement and the like intended for consumption by a human being. A "temporal attribute," as used in this disclosure, is any recommended day, time, and/or meal that a refreshment is recommended to be consumed at. A temporal attribute may include a specific mealtime, such as a refreshment that is recommended to be consumed for lunch at 12:30 pm, or a refreshment that is recommended to be consumed for breakfast at 7:00 am on a Wednesday. Computing device 104 generates a refreshment instruction set 148 utilizing a plurality of recipes 132 relating to an alimentary instruction set and assigns a recipe to a various day, time, and/or meal. For instance and without limitation, computing device 104 may assign a refreshment option of millet cereal topped with coconut cream and fresh berries to breakfast on a Monday, and a refreshment option of dairy free eggplant parmesan to dinner on a Tuesday, for a user following a vegan alimentary style 120. Computing device 104 may select a particular recipe for a particular day, meal, and/or time, by obtaining information relating to a user's calendar. Computing device 104 identifies an appointment relating to a user. An "appointment," as used in this disclosure, is any event contained within a schedule. An appointment may include a work related engagement, such as a meeting a user may have with a co-worker. An engagement may include a personal engagement, such as an appointment a user may have with the user's medical doctor. Computing device 104 may retrieve information relating to an appointment for a user from selection database 116. In an embodiment, computing device 104 receives inputs from remote device operated by a user containing any calendar information that contains information relating to a user's appointments. Computing device 104 locates a constructed refreshment contained within a refreshment instruction set 148 and assigns the constructed refreshment on the day of the appointment. A "constructed refreshment," as used in this disclosure, is any prepared meal that requires minimal cooking and/or preparation time. A constructed refreshment may include a meal that was previously prepared and/or cooked and requires very minimal preparation and/or hands on cooking time by a user. For example, a constructed refreshment may include a previously cooked meal that a user needs to reheat in an oven to serve. In yet another non-limiting example, a constructed refreshment may include a meal that requires very little cooking time and/or preparation such as making a sandwich with cold cuts or preparing quick cooking oats that are ready in five minutes. Computing device 104 assigns a constructed refreshment on the day of an appointment. In an embodiment, computing device 104 may assign a constructed refreshment when an appointment may be scheduled within a certain time frame of when a user typically consumes meals. For example, a constructed refreshment such as a yogurt parfait that can be prepared within mere minutes may be assigned on a day when a user has an appointment at 9 am and the user usually eats breakfast at 8:30 am. Information pertaining to a user's typical eating schedule and mealtimes may be contained within selection database 116.

With continued reference to FIG. 1, computing device 104 is configured to receive a user refreshment activity 152 from remote device. A "refreshment activity," as used in this disclosure, is a description of any action and/or steps that a user took in response to a refreshment instruction set 148. A refreshment activity may include any ingredients purchased and/or necessary to prepare one or more recipes contained within a refreshment instruction set 148. A refreshment activity may include an action that a user took, such as to prepare and cook one or more recipes contained within a refreshment instruction set 148. A refreshment activity may include a log of one or more meals that a user consumed. Computing device 104 may classify, using a first classification algorithm, a user refreshment activity 152 to an adherence label. A "first classification algorithm," as used in this disclosure, is a process whereby computing device 104 derives from training data, a model known as a "classifier" for sorting inputs into categories or bins of data. Classification algorithms may include linear classifiers such as logistic regression, Naïve Bayes classification, Fisher's linear discriminant, k-nearest neighbors, support vector machines, quadratic classifiers, Kernel estimation, decision trees, boosted trees, random forest, neural networks, and the like. A first classification algorithm utilizes a user refreshment activity 152 as an input, and outputs an adherence label 156. A classifier may be trained using training data. "Training data," as used in this disclosure, is data containing correlations that a machine-learning process including a machine-learning algorithm and/or machine-learning process may use to model relationships between two or more categories of data elements. Training data may be formatted to include labels, for instance by associating data elements with one or more descriptors corresponding to categories of data elements. Training data may not contain labels, where training data may not be formatted to include labels. Training data may be obtained from records of previous iterations of generating first classification algorithm, user inputs, user questionnaire responses, expert inputs, and the like.

With continued reference to FIG. 1, an "adherence label," as used in this disclosure, is a description as to how compliant a user has been with a refreshment instruction set 148. An adherence label 156 may indicate compliance on a continuum and may reflect a user's compliance with numerical and/or character scores. For example, adherence may be calculated using numerical scores on a scale from 0 to 10, where an adherence label 156 containing a score of 0 may indicate a user who was completely noncompliant, while an adherence label 156 containing a score of 10 may indicate a user who was completely compliant. In yet another non-limiting example, compliance may be reflected with character scores, where an adherence label 156 containing a response of extremely compliant may be used to describe a user who followed all recommendations contained within a refreshment instruction set 148, while an adherence label 156 containing a response of not compliant may be used to describe a user who did not follow any recommendations contained within a refreshment instruction set 148. Computing device 104 updates a refreshment instruction utilizing an adherence label 156. For example, an adherence label 156 that indicates a user was not compliant and did not follow any recommendations contained within a refreshment instruction set 148, may be utilized to select recipes that are very easy to prepare, and that do not require complex ingredients. In yet another non-limiting example, an adherence label 156 that indicates a user was mostly compliant may be utilized by computing device 104 to recommend similar meals and/or similar ingredients in an updated refreshment instruction set 148.

With continued reference to FIG. 1, computing device 104 is configured to create a list of elements 160 necessary to create a plurality of recommended refreshments. A "list," as used in this disclosure, is any aggregation of ingredients needed to prepare a refreshment instruction set 148. A list may be categorized based on elements offered and/or available for purchase at refreshment providers. For example, information contained within selection database 116 may contain preferences as to grocery stores and/or e-commerce sites where a user may purchase ingredients. In such an instance, computing device 104 categorizes elements from a list, to aggregate items that may be available and/or located together at a certain refreshment provider. For instance and without limitation, selection database 116 may contain information that a user purchases all meat ingredients from a butcher and all produce ingredients, and pantry items from a grocery store, and all dairy products from a local dairy farm. In such an instance, computing device 104 categorizes a list so that there is a first list for all ingredients a user needs to purchase from a butcher, a second list for all ingredients a user needs to purchase from a grocery store, and a third list for all ingredients a user needs to purchase from a local dairy farm.

With continued reference to FIG. 1, computing device 104 is configured to generate a recipe machine-learning model 164 that utilizes a user selection 112 as an input and outputs recommended refreshments. A "recipe machine-learning model," as used in this disclosure, is a mathematical representation of a relationship between inputs and outputs, as generated using any machine-learning process and/or machine-learning algorithm including without limitation any process as described herein, and stored in memory; an input is submitted to a machine-learning model once created, which generates an output based on the relationship that was derived. Generating recipe machine-learning model 164 may include calculating one or more supervised machine-learning algorithms including active learning, classification, regression, analytical learning, artificial neural network, backpropagation, boosting, Bayesian statistics, case-based learning, genetic programming, Kernel estimators, naïve Bayes classifiers, maximum entropy classifier, conditional random field, K-nearest neighbor algorithm, support vector machine, random forest, ordinal classification, data pre-processing, statistical relational learning, and the like. Generating recipe machine-learning model 164 may include calculating one or more unsupervised machine-learning algorithms, including a clustering algorithm such as hierarchical clustering, k-means clustering, mixture models, density based spatial clustering of algorithms with noise (DBSCAN), ordering points to identify the clustering structure (OPTICS), anomaly detection such as local outlier factor, neural networks such as autoencoders, deep belief nets, Hebbian learning, generative adversarial networks, self-organizing map, and the like. Generating recipe machine-learning model 164 may include calculating a semi-supervised machine-learning algorithm such as reinforcement learning, self-learning, feature learning, sparse dictionary learning, anomaly detection, robot learning, association rules and the like. Recipe machine-learning model 164 is trained by computing device 104 using training data, including any of the training data as described herein. Training data may be obtained from records of previous iterations of generating recipe machine-learning model 164, user inputs and/or questionnaire responses, expert inputs, and the like. Recipe machine-learning model 164 may be implemented as any machine-learning process, including for instance, and without limitation, as described in U.S. Nonprovisional application Ser. No. 16/375,303, filed on Apr. 4, 2019, and entitled "SYSTEMS AND METHODS FOR GENERATING ALIMENTARY INSTRUCTION SETS BASED ON VIBRANT CONSTITUTIONAL GUIDANCE," the entirety of which is incorporated herein by reference. Recipe machine-learning model 164 is trained using training data to select recommended refreshments favored by a user selection 112. In an embodiment, user selection 112 contained within selection database 116 may be utilized as training data to customize and train recipe machine-learning model 164 individually for each user. For instance and without limitation, user selection 112 that indicate a user prefers to eat foods that contain protein choices that contain either chicken, tofu or salmon and the user dislikes protein choices that contain beef or pork may be utilized as training data to generate recommended refreshments such as chicken picada, tofu and green bean stir fry, and miso glazed salmon, and to not generate recommended refreshments such as a ground beef stir fry or a pork burger.

With continued reference to FIG. 1, system 100 includes a remote device for generating a refreshment instruction set 148 based on individual preferences. Remote device includes any of the remote devices as described herein. Remote device includes a preference module, which may be implemented as any hardware and/or software module. Preference module is configured to collect a user selection 112 relating to nourishment. A user selection 112 includes any of the user selection 112 as described above in more detail. Preference module may collect a user selection 112 such as by displaying a photograph and/or names of one or more refreshments on remote device and collecting a user's likes and/or dislikes regarding refreshments. For instance and without limitation, preference module may display a photograph of a refreshment such as pasta and prompt a user to answer questions regarding pasta, such as if the user likes or dislikes pasta, how many times each week the user eats pasta, brands of pasta that the user likes or dislikes, serving size of pasta that the user likes, and the like. Remote device may include a graphical user interface that may display refreshments to a user. Graphical user interface may include without limitation, a form or other graphical element having display fields, where one or more elements of information may be displayed. Graphical user interface may include sliders that a user may adjust to indicate the user's like or dislike of various refreshments. Graphical user interface may include free form textual entries, where a user may type in information regarding user selection 112. In an embodiment, remote device may display on graphical user interface a series of questions to prompt a user for more information. In an embodiment, graphical user interface may display one or more answer choices that a user may selection an answer from in response to a questionnaire or other prompts for information. In yet another non-limiting example, a user may be able to type in a customized response in a free form textual entry. Information pertaining to a user selection 112 may be stored locally on remote device, such as in memory or in a database located on remote device. In an embodiment, information pertaining to a user selection 112 may be transmitted from remote device to computing device 104 to be stored within selection database 116.

With continued reference to FIG. 1, preference module located on remote device is configured generate a list of preferred elements. A "list of preferred elements," as used in this disclosure, is any aggregation of refreshments including ingredients and/or meals that a user likes. Remote device assembles a list of preferred elements by evaluating a user selection 112, to identify refreshments that a user prefers. For instance and without limitation, remote device may evaluate a user selection 112 that suggests a user likes salmon, avocado, and wild rice, and dislikes baked potato, cod, and halibut to generate a list of preferred elements that contains salmon, avocado, and wild rice. In yet another non-limiting example, a user selection 112 that indicates a user habitually consumes turkey in a lettuce wrap with pickles for lunch may be utilized to generate a list of preferred elements. Remote device uses a list of preferred elements to create a refreshment instruction set 148. Refreshment instruction set 148 includes any of the refreshment instruction set 148 as described herein. Preference module is configured to generate refreshment instruction set 148 using one or more machine-learning processes, including any of the machine-learning processes as described herein. Preference module is configured to generate recipe machine-learning model, wherein recipe machine-learning model utilizes a user selection as an input, and outputs a plurality of recommended refreshment contained within refreshment instruction set. Preference module trains recipe machine-learning model utilizing training data, including any of the training data as described herein. Training data utilized to train recipe machine-learning module is obtained from previous iterations of recipe machine-learning model, user inputs and/or user questionnaires, and/or expert inputs. Remote device utilizes a list of preferred elements to generate a refreshment instruction set 148. For instance and without limitation, a list of preferred elements may contain ingredients that a user routinely consumes, such as bacon, steak, kale, spinach, oatmeal, berries, sweet potato, chicken, and gluten free bread. In such an instance, remote device utilizes preferred elements to generate a refreshment instruction set 148. In an embodiment, remote device may select other ingredients to include within refreshment instruction set 148 that may be related to and/or similar to ingredients that a user routinely consumes. For example, a list of preferred elements that indicates a user consumes ground beef may be utilized by remote device to recommend a refreshment contained within refreshment instruction set 148 that contains filet mignon or a ribeye steak. In yet another non-limiting example, a list of preferred elements that does not include any cruciferous vegetables such as cauliflower, Brussel sprouts, and/or kale may be utilized by remote device to generate a refreshment instruction set 148 that does not contain any cruciferous vegetables.

With continued reference to FIG. 1, remote device includes an image capture device designed and configured to capture an image of a refreshment. An "image capture device," as used in this disclosure, is any device suitable to take a photograph of a refreshment. An image capture device may include for example, a camera, mobile phone camera, scanner, and the like. A user may utilize an image capture device located on remote device to take a photograph of a user selection 112 relating to nourishment. For example, a user may utilize an image capture device to photograph meals that a user enjoys eating, foods that a user likes, meals that a user dislikes, foods that a user dislikes, and the like. Remote device utilizes an image of a refreshment to generate a list of preferred elements as described above in more detail.

Figure 2:
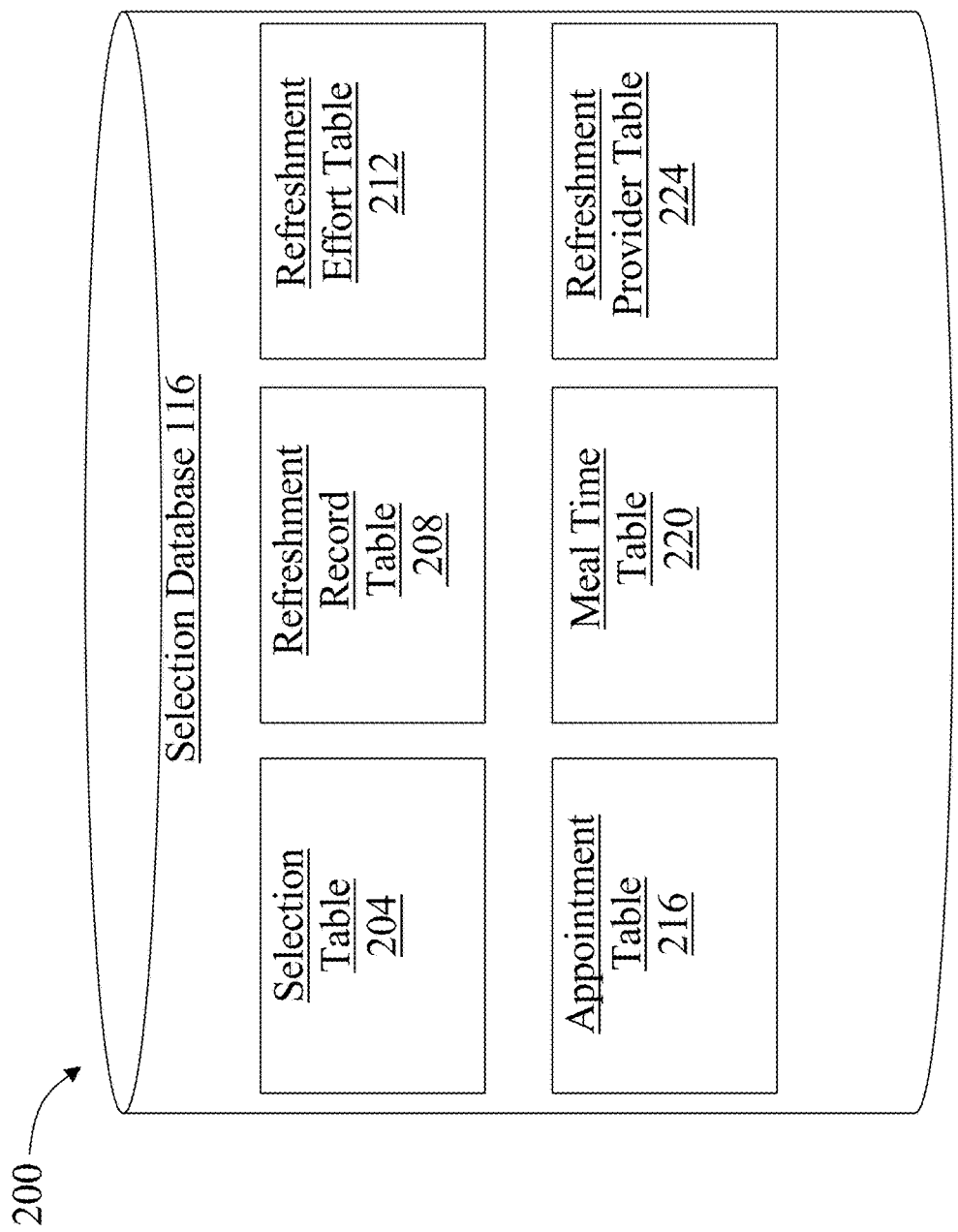
FIG. 2 is a block diagram illustrating an exemplary embodiment of a selection database.

Referring now to FIG. 2, an exemplary embodiment 200 of selection database 116 is illustrated. Selection database 116 may be implemented as any data structure as described above in more detail in reference to FIG. 1. One or more tables contained within selection database 116 may include selection table 204; selection table 204 may contain a user selection 112 relating to nourishment. For instance and without limitation, selection table 204 may contain an entry specifying that a user likes foods that taste sweet such as berries, watermelon, cantaloupe, and sweet potatoes, and the user dislikes foods that contain eggs. One or more tables contained within selection database 116 may include refreshment record table 208; refreshment record table 208 may include one or more elements of a user refreshment record 124. For instance and without limitation, refreshment record table 208 may contain an entry describing a meal a user consumed for dinner that consisted of a slow braised lamb shank served over Israeli couscous with a side of steamed carrots. One or more tables contained within selection database 116 may include refreshment effort table 212; refreshment effort table 212 may include elements of data relating to a user refreshment effort 136. For instance and without limitation, refreshment effort table 212 may contain an entry specifying that a user prefers to cook meal that can be ready in forty five minutes and that require no more than ten ingredients or less. One or more tables contained within selection database 116 may include appointment table 216; appointment table 216 may contain information pertaining to any appointments a user has. For instance and without limitation, appointment table 216 may contain an entry containing all appointments a user has over the next upcoming three weeks, including all personal appointments, work related appointments and the like. One or more tables contained within selection database 116 may include mealtime table 220; mealtime table 220 may include information describing times of the day when the user generally consumes various meals. For instance and without limitation, mealtime table 220 may contain an entry specifying that a user consumes breakfast every day at 7:30 am, lunch at 12:30 pm, dinner at 6:30 pm, and a snack at 3:30 pm on days when a user participates in a fitness class. One or more tables contained within selection database 116 may include refreshment provider table 224; refreshment provider table 224 may include information pertaining to a user's preferences regarding refreshment providers. For instance and without limitation, refreshment provider table 224 may contain an entry specifying refreshment providers that a user purchases refreshments from, such as a local farm stand where a user purchases fresh dairy and produce products, and a local grocery store where a user purchases all other refreshments including meat products, canned goods, pantry staples, and the like.

Figure 3:
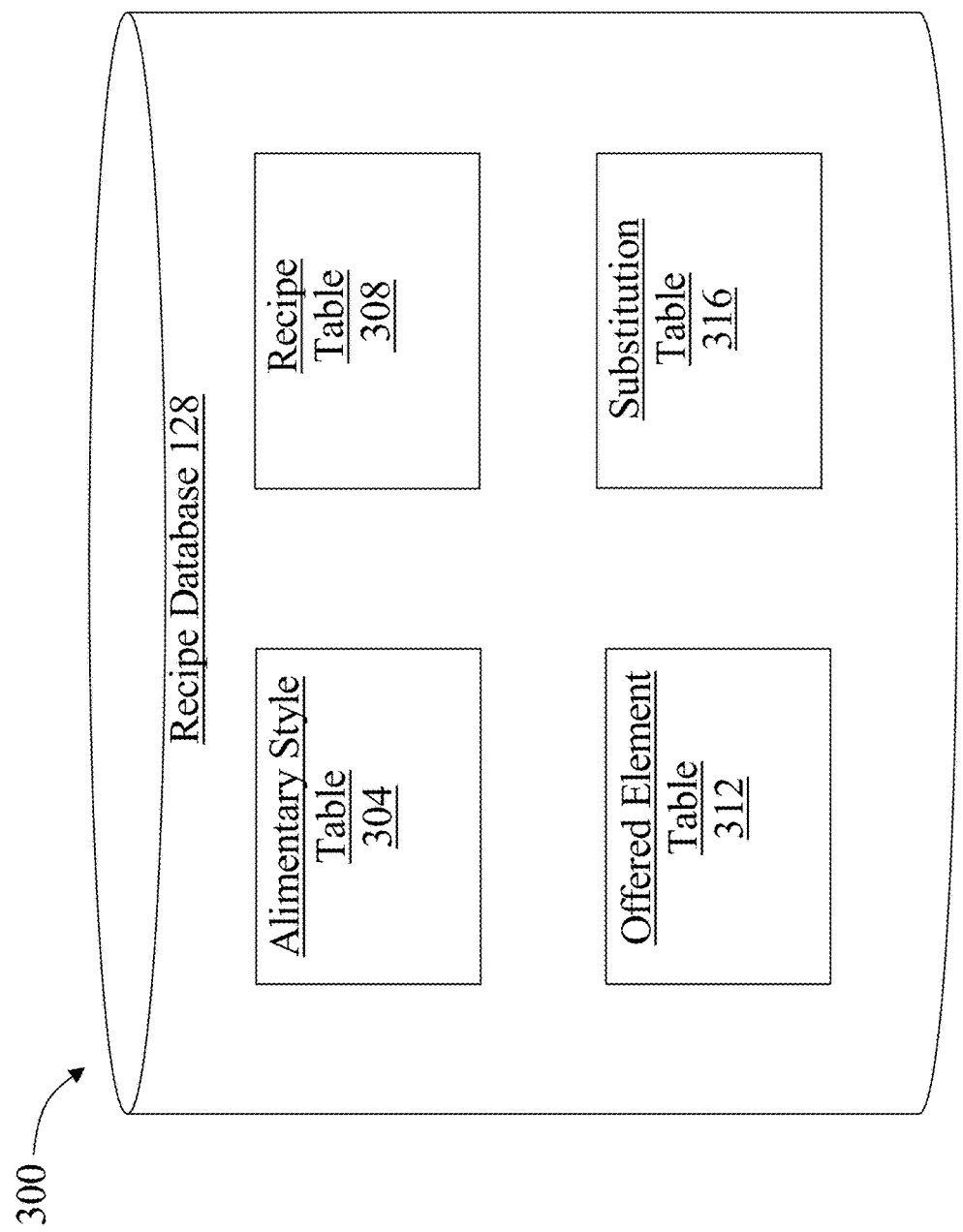
FIG. 3 is a block diagram illustrating an exemplary embodiment of a recipe database.

Referring now to FIG. 3, an exemplary embodiment 300 of recipe database 128 is illustrated. Recipe database 128 may be implemented as any data structure as described above in more detail in reference to FIG. 1. One or more tables contained within recipe database 128 may include alimentary style table 304; alimentary style table 304 may contain information pertaining to alimentary style 120. For instance and without limitation, alimentary style table 304 may contain information from experts detailing various refreshments included and not included with different alimentary style 120 such as a vegan alimentary style 120 which eliminates the use of all animal products. One or more tables contained within recipe database 128 may include recipe table 308; recipe table 308 may contain a plurality of recipes 132, which may be organized according to alimentary style 120, ease of cooking, complexity, time to prepare, and the like. For instance and without limitation, recipe table 308 may contain a recipe for grain free blueberry muffins which may be organized as complying with grain free alimentary style 120, gluten free alimentary style 120, vegan alimentary style 120, and vegetarian alimentary style 120. One or more tables contained within recipe database 128 may include offered element table 312; offered element table 312 may contain ingredients available for sale and/or purchase within the user location 140. For instance and without limitation, offered element table 312 may contain ingredients available in season within a user location 140. One or more tables contained within recipe database 128 may include substitution table 316; substitution table 316 may contain a list of ingredients that can be substituted for one another in recipes. For instance and without limitation, substitution table 316 may contain a list that identifies a flax seed egg that can be substituted for a real egg when a real egg is not available or when a recipe needs to be made vegan.

Figure 4:
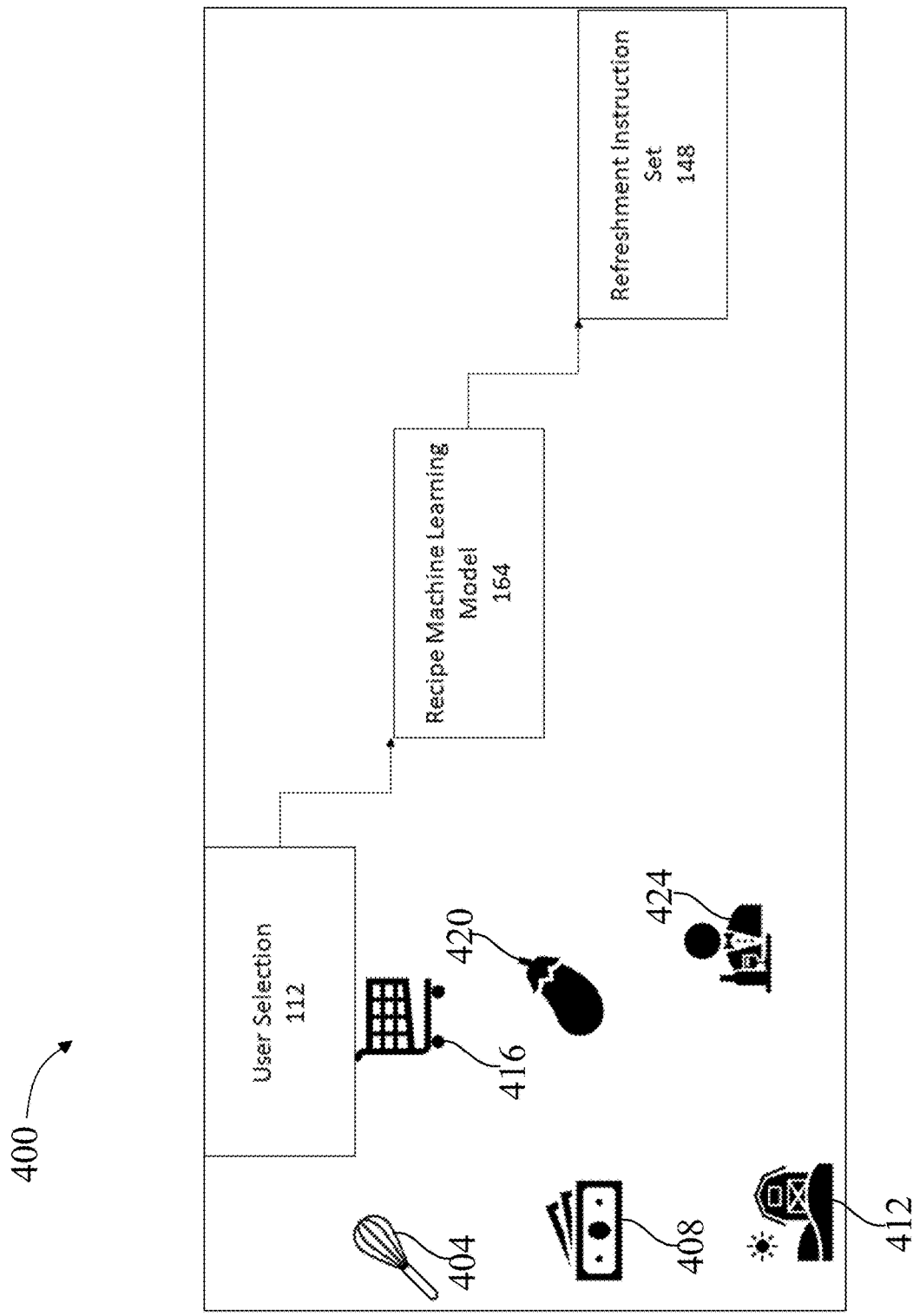
FIG. 4 is a representative diagram illustrating an exemplary embodiment of user selection data.

Referring now to FIG. 4, an exemplary embodiment 400 of user selection 112 data that may be utilized to generate a refreshment instruction set 148 is illustrated. Computing device 104 utilizes information pertaining to a user selection 112 as an input to generate recipe machine-learning model 164. Recipe machine-learning model 164 outputs a plurality of recommended refreshments. Information pertaining to a user selection 112 may be stored within selection database 116 as described above in more detail in reference to FIG. 1. A user selection 112 may relate to user habits 404 surrounding cooking, such as cooking skills the user has, culinary experience, meals the user enjoys preparing at home, amount of time that a user devotes to preparing meals at home, and the like. A user selection 112 may relate to a user's budget 408, indicating how much money a user spends on ingredients, and products from refreshment locations, such as how much money a user spends per month or per week. A user selection 112 may relate to a user's preference regarding sourcing of ingredients 412, such as if a user buys only organically grown products and ingredients, fair trade ingredients, non-genetically modified organisms (GMOs), and the like. A user selection 112 may relate to a user's habits 416, including how often the user shops for ingredients, refreshment providers that the user shops at, whether the user shops in person or online and the like. A user selection 112 may relate to a user's preference regarding ingredients 420, such as particular ingredients a user likes or dislikes, meals a user likes or dislikes, and the like. A user selection 112 may relate to a user's preference regarding prepared foods 424, such as how many times per week a user orders food from a restaurant if a user dines in at a restaurant or purchases carry-out or delivery and the like. Computing device 104 utilizes one or more user selection 112 as an input to recipe machine-learning model 164. Recipe machine-learning model 164 outputs a refreshment instruction set 148, containing a meal plan recommended for a user over a specified period of time.

Figure 5:
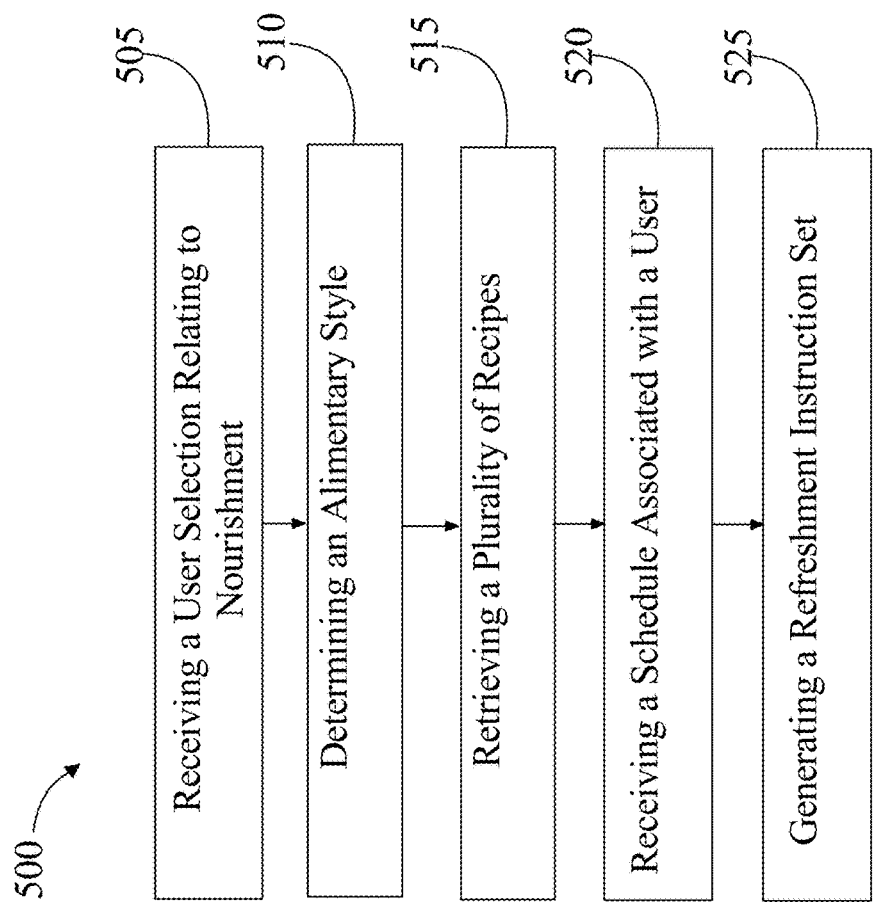
FIG. 5 is a process flow diagram illustrating an exemplary embodiment of a method of generating a refreshment instruction set based on individual preferences.

Referring now to FIG. 5, an exemplary embodiment 500 of a method of generating a refreshment instruction set 148 based on individual preferences is illustrated. At step 505, computing device 104 receives from a remote device, a user selection 112 relating to nourishment. A user selection 112 includes any of the user selection 112 as described above in more detail in reference to FIGS. 1-4. A user selection 112 may contain a user's likes and/or dislikes for certain foods ingredients, meals, mealtimes, number of meals consumed each day, quantity of food consumed at each meal, and the like. A user selection 112 may contain information describing a user's budget regarding food ingredients and/or food products, a user's habits as to how often a user cooks meals at home versus ordering takeout, refreshment locations that a user frequents, ethical sourcing of ingredients and the like. A user selection 112 may be stored in selection database 116 as described above in more detail in reference to FIG. 1.

With continued reference to FIG. 5, at step 510, computing device 104 determines an alimentary style 120 relating to a user selection 112. An alimentary style 120 describes a user's eating style and/or eating habits. An alimentary style 120 may describe a certain diet that a user may follow such as a lactose free diet, or a ketogenic diet. Information pertaining to an alimentary style 120 may be stored within recipe database 128. An alimentary style 120 may describe certain foods that a user doesn't consume because of an allergy, dislike for a particular food and the like. For example, an alimentary style 120 may describe a user who consumes a standard American diet but does not eat any pork products because the user dislikes the taste of all pork products. In yet another non-limiting example, an alimentary style 120 may describe a user who does not consume any products that contain tree nuts, because the user has a long-standing allergy to all tree nut containing products. Computing device 104 determines an alimentary style 120 by consulting alimentary database to identify a particular alimentary style 120 utilizing information contained within a user selection 112. Computing device 104 may generate a query and search alimentary database to locate an alimentary style 120 utilizing information contained within a user selection 112. For instance and without limitation, a user selection 112 that indicates a user dislikes all meat products may be utilized by computing device 104 to generate a query and locate an alimentary style 120 such as a pescatarian alimentary style 120 or a vegetarian alimentary style 120. Computing device 104 may ask a user a series of follow-up questions when more than one alimentary style 120 may apply. For example, in the previous example, computing device 104 may prompt a user to ask a series of questions such as if the user is comfortable consuming fish containing products or if the user eliminates all animal containing products.

With continued reference to FIG. 5, computing device 104 determines an alimentary style 120 utilizing a user refreshment record 124. A user refreshment record 124 includes any of the user refreshment record 124 as described above in more detail in reference to FIG. 1. A user refreshment record 124 may contain a description of one or more meals that a user may have previously consumed. For instance and without limitation, a user refreshment record 124 may contain an entry containing a description of all meals a user consumed over the previous seven days. Computing device 104 evaluates a user refreshment record 124 to determine an alimentary style 120 utilizing information contained within the user refreshment record 124. For example, computing device 104 may analyze components of each meal contained within a user refreshment record 124 to determine an alimentary style 120. Computing device 104 may consult recipe database 128 to discover more information relating to alimentary styles that may be compiled based on expert inputs and expert advice. Computing device 104 determines an alimentary style 120 using an element of user refreshment data.

With continued reference to FIG. 5, at step 515, computing device 10 retrieves a plurality of recipes 132 relating to an alimentary style. A recipe, is a set of instructions for the preparation of a particular dish, including a list of ingredients required to prepare the dish, as described above in more detail in reference to FIG. 1. A recipe relates to an alimentary style 120 when the recipe contains ingredients that conform with the alimentary style 120. For instance and without limitation, a recipe for chicken parmesan would not relate to a vegan alimentary style 120, while a recipe for tofu and broccoli stir-fry would relate to a vegan alimentary style 120. In yet another non-limiting example, a recipe for steak frites may relate to a gluten free alimentary style 120 and a grain free alimentary style 120. Information pertaining to alimentary style 120 and recipes may be stored within recipe database 128 as described above in more detail. Computing device 104 locates recipes utilizing data relating to a user refreshment effort 136. A user refreshment effort 136 includes any of the user refreshment effort 136 as described above in more detail in reference to FIG. 1. A user refreshment effort 136 may contain a description of how much time, effort, and/or skill a user has in regards to preparing meals and/or following recipes. For example, a user refreshment effort 136 may contain information describing a user's culinary skills and experience, which may reflect that the user enjoys cooking meals that take twenty minutes or less. In yet another non-limiting example, a user refreshment effort 136 may describe a user who has taken adult education cooking classes and who enjoys cooking complex meals. Computing device 104 retrieves a plurality of recipes 132 intended for a user refreshment effort 136. In an embodiment, recipes stored within recipe database 128 may be organized by skill level and level of difficulty. In such an instance, computing device 104 may match a user refreshment effort 136 to a recipe intended for the same and/or similar user refreshment effort 136. For instance and without limitation, a user refreshment effort 136 that contains a description of a user who likes meals that are cooked and ready in one hour or less may be matched by computing device 104 to a plurality of recipes 132 that are intended for home cooks and that can be prepared in forty five minutes or less. In yet another non-limiting example, a user refreshment effort 136 that contains a description of a user who likes to cook very gourmet and complex meals may be matched by computing device 104 to a plurality of recipes 132 that are complex and may take hours to prepare.

With continued reference to FIG. 5, computing device 104 adjusts recipes based on offered element 144 available with a specified location of a user. Computing device 104 receives from a remote device a user location 140. Computing device 104 receives a user location 140 from remote device utilizing any network methodology as described herein. A user location 140 includes any of the user location 140 as described above in more detail. A user location 140 may contain information describing a GPS position of a user's remote device. In yet another non-limiting example, a user location 140 may contain a description of where a user will be traveling to and be located in upcoming months. Information pertaining to a user location 140 may be contained within selection database 116. Computing device 104 identifies offered element 144 contained within a user location 140. An offered element 144 includes any recipe ingredient available for sale and/or purchase within the user location 140. For instance and without limitation, an offered element 144 may include an ingredient such as a Madagascar vanilla bean. Computing device 104 identifies if offered element 144 are available within a user location 140. Information pertaining to availability of offered elements may be contained within recipe database 128. Computing device 104 may determine if an offered element 144 is available, by generating a query and retrieving information pertaining to an offered element 144 from within recipe database 128. Computing device 104 adjusts a recipe as a function of offered element 144 contained within a user geolocation and an alimentary style 120. For instance and without limitation, a user located in Bellingham, Wash. may be unable to obtain a Madagascar vanilla bean. In such an instance, computing device 104 may consult recipe database 128 and identify a substitution that can replace Madagascar vanilla bean and still comply with a user's alimentary style 120. In such an instance, computing device 104 may identify a second offered element that be substituted and available within the user's location, such as vanilla extract. In yet another non-limiting example, computing device 104 may identify an offered element 144 such as fresh strawberries that are not available for a user within the user's location during winter months, when it is too cold to grow strawberries. In such an instance, computing device 104 adjusts a recipe to suggest frozen strawberries instead during the winter months when fresh strawberries are unavailable.

With continued reference to FIG. 5, at step 520, computing device 104 receives a schedule associated with a user. A schedule includes any of the schedules as described above in more detail in reference to FIG. 1. A schedule may contain one or more appointments pertaining to a user, including any of the appointments as described above in more detail in reference to FIG. 1. In an embodiment, a schedule may contain a series of appointments scheduled for the next six weeks or a given period of time. In an embodiment, computing device 104 receives an updated schedule such as when appointments are changed or scheduled at different times, utilizing any network methodology as described herein.

With continued reference to FIG. 5, at step 525, computing device 104 generates a refreshment instruction set 148. A refreshment instruction set 148 includes any of the refreshment instruction set 148 as described above in more detail in reference to FIG. 1. A refreshment instruction set 148 includes a meal plan containing recommended refreshments and a suggested temporal attribute. Computing device 104 generates a refreshment instruction set 148 by generating a recipe machine-learning model 164. Recipe machine-learning model 164 includes any of the recipe machine-learning model 164 as described above in more detail in reference to FIG. 1. Recipe machine-learning model 164 utilizes a user selection 112 as an input and outputs recommended refreshments. Recipe machine-learning model 164 is trained utilizing any of the training data as described above in more detail in reference to FIG. 1. Recipe machine-learning model 164 is trained using training data to select recommended refreshments favored by a user selection 112. For instance and without limitation, one or more user selection 112 contained within selection database 116 may be utilized as training data to customized recipe machine-learning model 164 to selected recommended refreshments favored by a user selection 112. For instance and without limitation, a user selection 112 that contains an entry specifying that a user enjoys consuming foods that contain ingredients such as black beans, grains, vegetables such as zucchini, carrots, and celery may be utilized to train recipe machine-learning model 164 to output recommended refreshments containing those ingredients. Recommended refreshments include any of the recommended refreshments as described above in more detail in reference to FIG. 1. A recommended refreshment may include a recommended and/or suggested meal contained within a refreshment instruction set 148. A recommended refreshment may contain a suggested day and/or time when the recommended refreshment is suggested to be prepared and/or consumed. For example, a recommended refreshment may be suggested to be consumed for breakfast on a Friday or as an afternoon snack on a Wednesday. Computing device 104 assigns a recommended refreshment to a particular day and/or time based on identifying appointment information relating to a user. Appointment information includes any of the appointment information as described above in more detail in reference to FIG. 1. Computing device 104 may store appointment information relating to a user within selection database 116. Computing device 104 locates a constructed refreshment contained within a refreshment instruction set 148. A constructed refreshment includes any of the constructed refreshments as described above in more detail in reference to FIG. 1. Computing device 104 assigns a constructed refreshment on the day of an appointment. For instance and without limitation, computing device 104 may identify an appointment relating to a user on a Wednesday afternoon, when a user will be occupied with a work meeting from 4 pm until 6 pm. In such an instance, computing device 104 locates a constructed refreshment contained within a refreshment instruction set 148, such as a meal of a premade roast chicken with a side salad. In such an instance, computing device 104 assigns the constructed refreshment containing the roast chicken and the side salad on the Wednesday afternoon when the user is occupied and will not have much time to cook and/or prepare dinner.

With continued reference to FIG. 5, computing device 104 is configured to receive a user refreshment activity 152 from a remote device. A user refreshment activity 152 includes any of the user refreshment activities as described above in more detail in reference to FIG. 1. A user refreshment activity may include for example, a list of meals that a user ended up cooking and eating during the time period contained within a refreshment instruction set 148. Computing device 104 classifies, using a first classification algorithm, a user refreshment activity 152 to an adherence label 156. An adherence label 156 includes any of the adherence label 156 as described above in more detail in reference to FIG. 1. An adherence label 156 may contain an indication as to how well a user refreshment activity complied with a refreshment instruction set 148. For instance and without limitation, a user refreshment activity 152 that specifies a user has not prepared and/or cooked any meals as contained within a refreshment instruction set 148 may be classified to an adherence label 156 that describes the user as being non-compliant. Computing device 104 updates a refreshment instruction set 148 utilizing an adherence label 156. For example, an adherence label 156 that specifies a user has been moderately adherent may be utilized to update a refreshment instruction set 148 to recommend refreshments that can be cooked and/or prepared in less time or that may require less skill. In yet another non-limiting example, an adherence label 156 that specifies a user has been extremely compliant may be utilized to generate recipe recommendations that are of similar complexity and require similar preparations and/or ingredients. In yet another non-limiting example, an adherence label 156 that specifies a user has been moderately adherent may be utilized to update a refreshment instruction set 148 to select recommended refreshments that may be less complicated, and easier to prepare. In an embodiment, computing device 104 may prompt a user with one or more questions to determine what prevented a user from being completely adherent. In such an instance, computing device 104 may transmit to remote device one or more questions to evaluate and understand what happened and/or what prevented the user from being more compliant with a refreshment instruction set 148. Such information and/or responses from a user may be utilized to recommend refreshments that contain less complicated ingredients, are easier to prepare, require less skill or sophistication, require more basic culinary equipment and the like.

With continued reference to FIG. 5, computing device 104 creates a list of elements 160 necessary to create a plurality of recommended refreshments. A list includes any of the lists as described above in more detail in reference to FIG. 1. A list contains a compilation of elements needed to prepare and cook recommended refreshments contained within a refreshment instruction set 148. Computing device 104 may create a list of elements 160 and receive user feedback containing an input and/or selection as to which elements the user may already have at home. In such an instance, computing device 104 updates a list of elements 160 to contain only those elements that need to be purchased by a user. Computing device 104 categorizes a list of elements 160 offered at refreshment providers. Categorization includes sorting elements based on where a user can purchase elements at various refreshment locations. Computing device 104 may retrieve information pertaining to refreshment providers that a user shops at and purchases elements from stored in selection database 116. For instance and without limitation, a list of elements 160 may be categorized to contain a first list of elements 160 such as pantry staples that a user can purchase from an online virtual market, and a second list of elements 160 such as fresh produce and ethically raised meat that a user can purchase from a farm stand down the street from a user's house. In such an instance, computing device 104 categorizes elements to aggregate elements that a user needs to purchase at a first refreshment provider and elements that a user needs to purchase at a second refreshment provider.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
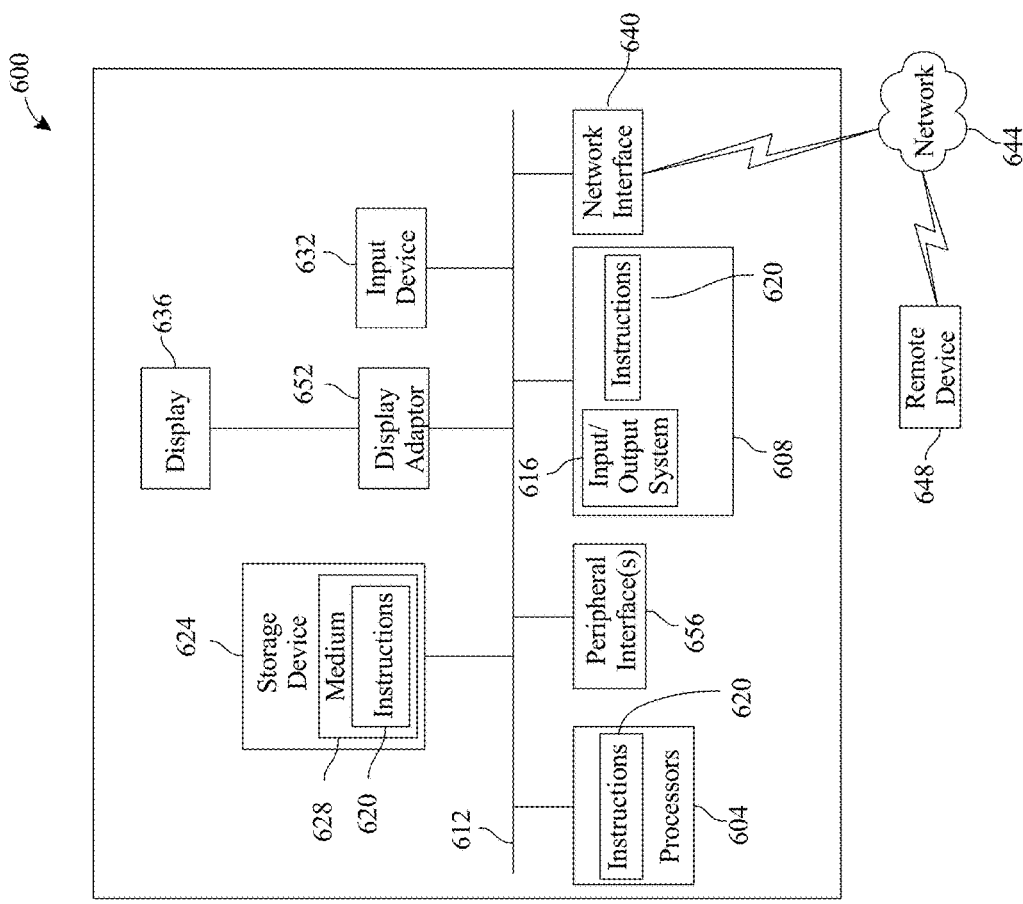
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Memory 608 may include various components (e.g., machine-readable media) including, but not limited to, a random access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A system for generating a refreshment instruction set based on individual preferences, the system comprising:
   a computing device the computing device designed and configured to:
   receive, from a remote device, a user selection relating to nourishment;
   determine an alimentary style relating to the user selection using an alimentary style classifier, wherein the alimentary style classifier utilizes the user selection relating to nourishment as an input, and outputs the alimentary style;
   retrieve a plurality of recipes relating to the alimentary style;
   receive a schedule associated with a user; and
   generate a refreshment instruction set including a plurality of recommended refreshments using the plurality of recipes wherein generating the refreshment instruction set further comprises:
   identifying an appointment relating to the user as a function of the schedule;
   locating a constructed refreshment contained within the refreshment instruction set; and assigning the constructed refreshment on a day of the appointment,
wherein the computing device is further configured to:
receive, a user refreshment activity from the remote device;
classify, using a first classification algorithm, the user refreshment activity to an adherence label; and
update the refreshment instruction set as a function of the adherence label.

2. The system of claim 1, wherein the computing device is further configured to:
receive, from the remote device, an element of a user refreshment record; and
identify the alimentary style using the element of the user refreshment record.

3. The system of claim 1, wherein the computing device is further configured to:
identify, an element of data relating to a user refreshment effort; and
locate, the plurality of recipes intended for the user refreshment effort.

4. The system of claim 1, wherein the computing device is further configured to:
receive, from the remote device, a user location;
identify offered elements contained within the user location; and
adjust a recipe as a function of offered elements contained within the user location and the alimentary style.

5. The system of claim 1, wherein the computing device is further configured to train the alimentary style classifier utilizing training data, wherein training data includes a plurality of data entries containing user selections correlated to corresponding alimentary styles.

6. The system of claim 1, wherein the computing device is further configured to:
create a list of elements necessary to create the plurality of recommended refreshments; and
categorize the list of elements offered at a refreshment provider.

7. The system of claim 1, wherein the computing device is further configured to generate a recipe machine-learning model, wherein the recipe machine-learning model utilizes the user selection as an input, and outputs the plurality of recommended refreshments.

8. The system of claim 7, wherein the recipe machine-learning model is trained using training data to select the plurality of recommended refreshments favored by the user selection.

9. A method of generating a refreshment instruction set based on individual preferences, the method comprising:
receiving by a computing device, from a remote device, a user selection relating to nourishment;
determining by the computing device, an alimentary style relating to the user selection using an alimentary style classifier, wherein the alimentary style classifier utilizes the user selection relating to nourishment as an input, and outputs the alimentary style;
retrieving by the computing device, a plurality of recipes relating to the alimentary style;
receiving a schedule associated with a user;
generating by the computing device, a refreshment instruction set including, a plurality of recommended refreshments using the plurality of recipes, wherein generating the refreshment instruction set further comprises:
identifying an appointment relating to the user as a function of the schedule;
locating a constructed refreshment contained within the refreshment instruction set; and
assigning the constructed refreshment on a day of the appointment,
wherein generating the refreshment instruction set further comprises:
receiving a user refreshment activity, from the remote device;
classifying, using a first classification algorithm, the user refreshment activity to an adherence label; and
updating the refreshment instruction set as a function of the adherence label.

10. The method of claim 9, wherein determining the alimentary style further comprises:
receiving from the remote device, an element of a user refreshment record; and
identifying the alimentary style using the element of the user refreshment record.

11. The method of claim 9, wherein locating the plurality of recipes further comprises:
identifying, an element of data relating to a user refreshment effort; and
locating the plurality of recipes intended for the user refreshment effort.

12. The method of claim 9, wherein locating the plurality of recipes further comprises:
receiving from the remote device, a user location;
identifying offered elements contained within the user location; and
adjusting a recipe as a function of offered elements contained within the user location and the alimentary style.

13. The method of claim 9, wherein determining the alimentary style further comprises: training the alimentary style classifier utilizing training data, wherein training data includes a plurality of data entries containing user selections correlated to corresponding alimentary styles.

14. The method of claim 9, wherein generating the refreshment instruction set further comprises:
creating a list of elements necessary to create the plurality of recommended refreshments; and
categorizing the list of elements offered at a refreshment provider.

15. The method of claim 9, wherein generating the refreshment instruction set further comprises generating a recipe machine-learning model, wherein the recipe machine-learning model utilizes the user selection as an input, and outputs the plurality of recommended refreshments.

16. The method of claim 15, wherein the recipe machine-learning model is trained using training data to select the plurality of recommended refreshments favored by the user selection.

* * * * *